United States Patent [19]

Tachibana et al.

[11] 4,366,546
[45] Dec. 28, 1982

[54] SIGNAL PROCESSOR FOR SKID CONTROL DEVICE

[75] Inventors: Akira Tachibana, Yokosuka; Akira Endo, Katsuta; Kenji Sekine, Tokyo, all of Japan

[73] Assignees: Hitachi, Ltd.; Nissan Motor Co., Ltd., both of Tokyo, Japan

[21] Appl. No.: 181,762

[22] Filed: Aug. 27, 1980

[30] Foreign Application Priority Data

Sep. 7, 1979 [JP] Japan .................................. 54-114076
Sep. 7, 1979 [JP] Japan .................................. 54-114077

[51] Int. Cl.³ .......................... B60T 8/02; G06G 7/48
[52] U.S. Cl. .................... 364/571; 364/426; 364/861; 343/7 PL; 343/8
[58] Field of Search ............. 364/426, 571; 343/7 PL, 343/8; 303/20, 91, 92, 93, 95

[56] References Cited

U.S. PATENT DOCUMENTS

| | | | |
|---|---|---|---|
| 3,820,855 | 6/1974 | Salotti et al. | 303/20 X |
| 3,893,113 | 7/1975 | Iten et al. | 343/8 X |
| 4,012,736 | 3/1977 | Angwin | 343/8 |
| 4,117,483 | 9/1978 | Fujiki | 343/8 |
| 4,157,850 | 6/1979 | Marouby | 364/426 X |

FOREIGN PATENT DOCUMENTS 2414698 10/1975 Fed. Rep. of Germany .

*Primary Examiner*—Felix D. Gruber
*Attorney, Agent, or Firm*—Antonelli, Terry & Wands

[57] ABSTRACT

A ground-vehicle-speed signal processing circuit for a skid control device is disclosed in which, when one or more pulses are dropped from a vehicle-speed signal detected by a Doppler radar vehicle speed sensor, the vehicle-speed output voltage is decreased in accordance with the deceleration just prior to the moment when the pulses are dropped, which is stored in a memory device, to generate a vehicle-speed signal having compensated appropriately the missing part in the detected signal.

6 Claims, 8 Drawing Figures

SIGNAL PROCESSOR FOR SKID CONTROL DEVICE

The present invention relates to a skid control device incorporated in a vehicle, and more particularly to a ground-vehicle-speed (i.e., vehicle-speed) signal processing circuit for a skid control device which can compensate a missing part in a vehicle-speed signal caused by the fact that a pulse is dropped from the vehicle-speed signal detected by a Doppler radar speed sensor.

Conventional skid control devices have, for example, a signal processing circuit such as shown in FIG. 1 of the accompanying drawings. In these skid control devices, the wheel speed is compared with the true ground-vehicle-speed to obtain the slip-ratio of the wheel, and the braking force is temporarily released when the slip-ratio exceeds a predetermined value to prevent wheel slip. In this type of skid control device, in determining the vehicle speed, the wheel speed is detected and the vehicle speed is estimated on the basis of the detected wheel speed, that is, a simulated vehicle-speed signal is produced. In such a skid control device, when a wheel is locked for some reason, the simulated vehicle-speed signal becomes erroneous as compared with the actual vehicle speed. To solve this problem, a Doppler radar speed sensor capable of measuring the vehicle speed with respect to the ground has been employed to obtain the true vehicle speed. In this case, however, unexpected failures and errors may occur in detecting the vehicle speed, due to the surface condition of the road and the running condition of the vehicle. To be more specific, in cases where a radar transmitting signal incident upon a road surface is subjected to specular reflection due to ice covering the road surface or a puddle formed on the road surface and consequently the receiving signal reflected back from the road surface is extremely weak, and moreover, the center level of the Doppler signal is varied due to the fact that the Doppler signal is affected by the frequency of the vertical vibration of the vehicle caused by the roughness of the road surface, there arises a problem that a Doppler pulse to be detected is missing.

To solve the above problem, a vehicle speed signal is decreased in amplitude at a constant rate defined by the supposed surface condition of the road, during the time when the Doppler pulse is missing. However, when a decrease in vehicle-speed signal, namely, the deceleration is set to a very low value, the vehicle is so controlled as to release the braking force, and thus the stopping distance is increased. Accordingly, the deceleration is set to a large value approximating the maximum deceleration, on the safe side. A conventional vehicle-speed signal processing circuit which performs the above operation will be explained with reference to FIG. 1. Referring to FIG. 1, a vehicle-speed pulse signal which is detected by a Doppler radar vehicle speed sensor 1, is applied to a waveform shaping circuit 2. The shaped pulse signal from the waveform shaping circuit 2 is applied to an integrated circuit 3 which is made up of a phase comparator 4, a voltage controlled oscillator (VCO) 5 and a buffer amplifier 10 having a high input impedance. The integrated circuit 3 forms a phase-locked loop (PLL) together with a diode 6 for rectifying the output of the phase comparator 4 and a low-pass filter made up of a resistor 7 and a capacitor 8. The output of the low-pass filter is fed back to the VCO 5. Electric charges on the capacitor 8 are discharged through a constant current discharge circuit 9 having a time constant corresponding to a set value of deceleration. Thus, the VCO 5 is connected to receive a feedback signal when the input pulse of the low-pass filter disappears or is missing. The feedback signal is amplified by the amplifier 10, and then is delivered as a ground vehicle-speed indicating signal $S_2$ to a skid control circuit for anti-skid control.

FIG. 2 is a graph which shows the voltage waveform of vehicle-speed signal, in which a vehicle-speed signal produced in a case where pulses are missing from the output of the vehicle speed sensor 1 and a vehicle-speed signal corresponding to a true vehicle speed are indicated by a solid line and a broken line, respectively. Referring back to FIG. 1, the diode 6 is reverse-biased during the period when a pulse is missing from the output of vehicle speed sensor 1, namely, from the output of the waveform shaping circuit 2. That is, the charging of the capacitor 8 is stopped during the above period, and electric charges on capacitor 8 are discharged at a constant rate through the constant current discharge circuit 9 which is usually made up of a resistance circuit, so as to decrease the vehicle speed in accordance with a set deceleration value independently of the actual deceleration at a time prior to the above period, as indicated by segmented solid lines AB and CD in FIG. 2.

As explained previously, in the conventional vehicle-speed signal processing circuit for a skid control device, a part of the vehicle speed signal corresponding to the missing pulse in the output of the vehicle speed sensor 1 is compensated by only a set fixed deceleration value approximating the maximum deceleration. As a result, there is a danger that the skid control device controls the braking force in accordance with a vehicle-speed signal which does not correspond to the actual vehicle speed, namely, locking the wheels earlier than usual. Further, with the above-mentioned vehicle-speed signal processing circuit, it is impossible to compensate the missing pulse in such a way that the skid control functions in accordance with the surface condition or the type of road.

A conventional anti-skid control system of this kind is discribed in a Japanese Patent Application (Application No. 47-933), which was laid open on Sept. 23, 1973, under laid-open No. 48-70572. In more detail, a speed sensor for measuring the vehicle speed with respect to the ground is described on page 3 of the laid-open specification and in FIG. 3 thereof, which speed sensor can interpolate or correct a dropout (or a missing Doppler pulse) in a Doppler signal as if a normal signal was present during the time when a Doppler pulse is missing.

Accordingly, an object of the present invention is to provide a vehicle-speed signal processing circuit for a skid control device which can compensate an unallowable dropout in a vehicle speed signal developed from a vehicle speed sensor in a satisfactory manner to solve the problems in conventional circuits.

Another object of the present invention is to provide a vehicle-speed signal processing circuit for a skid control device, which outputs a vehicle-speed signal capable of indicating a value approximating an actual vehicle speed even when a Doppler pulse is missing from a vehicle-speed signal developed from a Doppler radar vehicle speed sensor, and thus permits an optimal skid control, thereby increasing the safety.

The essence of the present invention lies in the fact that memory means such as a sample-and-hold circuit stores therein data on the vehicle deceleration just before a dropout of Doppler pulse occurs in a vehicle speed signal from a Doppler radar vehicle speed sensor, to compensate the dropout in the vehicle speed signal by a deceleration value equal to the deceleration data stored in the memory means. This is based on the assumption that the vehicle speed does not undergo a rapid change when the Doppler pulse is dropped from the vehicle speed signal, because of the vehicle's large mass, and that no abrupt change in the kind of road surface occurs.

According to another aspect of the present invention, when a Doppler pulse is missing from the vehicle speed signal, different deceleration values are successively employed to continuously compensate missing portions in the vehicle speed signal.

The present invention will be explained below in detail in conjunction with the accompanying drawings in which.

Figure 3:
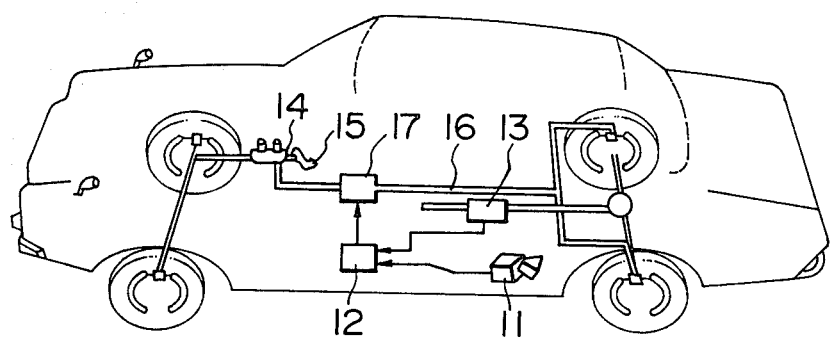
FIG. 3 shows the construction of an anti-skid control system, to which the present invention is applicable.

FIG. 3 shows the construction of an anti-skid control system for use in vehicles, to which the present invention is applied. In FIG. 3, reference numeral 11 designates a Doppler radar for detecting the vehicle speed with respect to the ground, 12 an anti-skid control device supplied with the output of the radar 11, 13 a wheel speed sensor for detecting the wheel speed, and 14 a braking device including a brake pedal 15, a pipe 16 and a pressure regulator 17. The anti-skid control device 12 compares the vehicle speed with the wheel speed, judges that the vehicle is placed in a skid condition when a value obtained by multiplying the vehicle speed by a coefficient (for example, 0.8) is greater than the wheel speed, and drives the pressure regulator 17 so as to decrease the brake fluid pressure, that is, to release the braking force. On the other hand, when the above value is smaller than the wheel speed, it is judged that the vehicle is maintained at a normal running condition, so that the brake fluid pressure is left unregulated.

Figure 4:
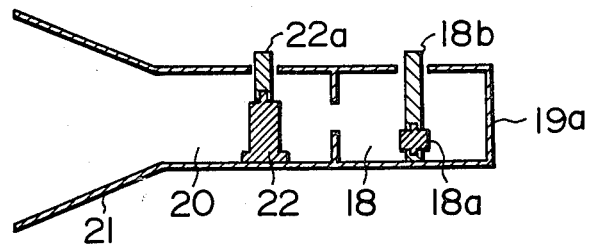
FIG. 4 is a sectional view showing a sensor part of a Doppler radar employed in the present invention.

FIG. 4 shows in detail a part of an example of the Doppler radar 11 shown in FIG. 3, namely, the portion from an antenna to an oscillator.

Referring to FIG. 4, an oscillator 18 comprises a waveguide 19a, a diode 18a for generating a microwave signal, such as a Gun diode, and an electrode 18b for supplying a voltage to diode 18a, to generate a transmitting wave. The transmitting wave is radiated from an antenna 21 through a coupler 20. A receiving wave incident upon the antenna 21 reaches a mixer diode 22 located in the coupler 20, and a Doppler signal $S_1$ is derived from an electrode 22a.

The construction of the Doppler radar 11 will next be briefly explained with reference to FIGS. 3 and 4.

A microwave signal is radiated from antenna 21 of Doppler radar 11 toward the road surface at an oblique angle $\theta$. The receiving wave which is reflected back from the road surface through scattering, is subjected to a Doppler shift due to the relative motion between the antenna and the ground, and then received by the antenna 21. When the vehicle speed, the incident angle of the microwave and the wavelength of the radiated microwave are expressed by V (m/s), $\theta$ and $\lambda$(m), respectively, the Doppler frequency $f_D$ (Hz) is given by the following equation:

$$f_D = (2V/\lambda) \cdot \cos \theta$$

The coupler 20 is provided to enable the antenna 21 to be used for both transmission and reception. A part of the transmitting wave generated by the oscillator 18 and the receiving wave reaching the coupler 20 are simultaneously applied to the mixer diode 22, and a beat signal of substantially sinusoidal waves (i.e., a Doppler shift signal $S_o$) generated on the basis of the difference in frequency between the transmitting and receiving waves is subjected principally to a processing for noise rejection in a known manner to produce a Doppler pulse signal $S_1$. The Doppler pulse signal $S_1$ is waveform-shaped by the waveform shaping circuit 2, and is then converted by a frequency-voltage converter such as a PLL into a phase-controlled digital or analog signal which is applied, as a vehicle speed signal or ground speed signal, to the control terminal of the anti-skid control device 12. As mentioned above, the vehicle-speed signal processing circuit for the anti-skid control device includes at least the waveform shaping circuit and the frequency-voltage converter.

Figure 5:
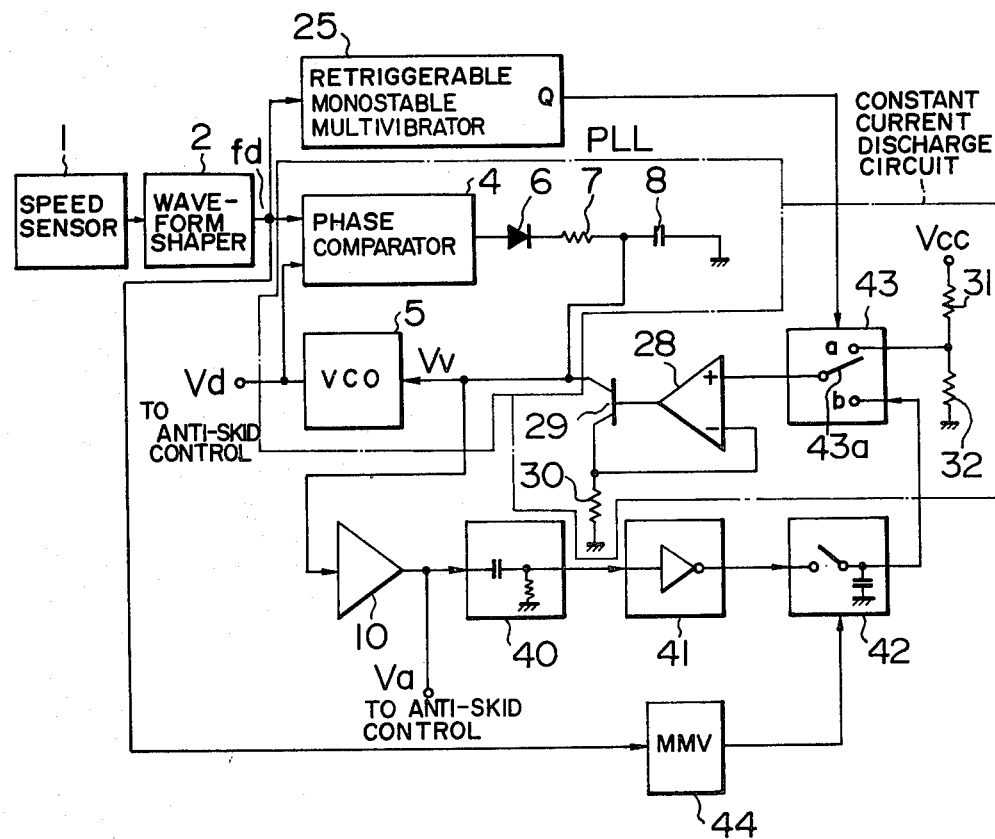
FIG. 5 is a block diagram showing an embodiment of a vehicle-speed signal processing circuit according to the present invention.

Now, explanation will be made of an embodiment of a vehicle-speed signal processing circuit according to the present invention, with reference to FIG. 5. In FIG. 5 which illustrates the embodiment, reference numerals 2, and 4 through 10 designate the same elements as in FIG. 1. The signal processing circuit comprises a retriggerable monostable multivibrator 25 (hereinafter referred to as an RMMV), which may be comprised of, for example, a CMOS IC (model CD 4047 AE) manufactured by RCA and which is used to determine and detect whether a pulse or pulses are missing from a vehicle speed signal or not, an operational amplifier 28, a transistor 29, and resistors 30 to 32. The operational amplifier 28, transistor 29 and resistors 30 to 32 make up the constant current discharge circuit 9. The transistor 29 and grounded resistor 30 form a discharge path for capacitor 8 of e.g. 3 $\mu$F. The signal processing circuit further comprises a differentiating circuit 40, an inverting amplifier 41, a sample-and-hold circuit 42 including a switching circuit and a capacitor, switch means 43 for changing over an input of the operational amplifier 28 between a constant voltage source and the output of the sample-and-hold circuit 42, and a monostable multivibrator 44 (hereinafter referred to as an MMV) operated by the output $f_d$ of the waveform shaping circuit 2. The sample-and-hold circuit 42 may be comprised of, for example, a CMOS IC (model CD 4053AE) manufactured by RCA, and the MMV 44 may be formed of a CMOS IC (model CD 4047AE) which can be used to form the RMMV 25. The output of the MMV 44 is applied to the sample-and-hold circuit 42 to sample the output of the inverter amplifier 41. Vehicle speed signals processed in the signal processing circuit can be derived at output terminals $V_a$ and $V_d$. In detail, an analog output is applied from output terminal $V_a$ to anti-skid control device 12, while a digital output is applied from output terminal $V_d$ to anti-skid control device 12.

Next, description will be made of the operation of the signal processing circuit shown in FIG. 5, with reference to FIG. 6.

The unstable period $T_1$ of the RMMV 25 is set to, for example, 3 msec, which is employed in a case where the Doppler frequency $f_D$ is equal to 300 Hz at a vehicle speed of 10 Km/hour. Period $T_1$ can be made variable, if necessary. In a case where vehicle-speed pulses $f_d$ (shown by A in FIG. 6) are normally produced from the waveform shaping circuit 2, for example, the vehicle-speed pulses are outputted with a pulse interval of less than 3 msec, the Q output of the RMMV 25 is kept in the state of "1". Thus, a contact 43a of switch means 43 is kept in contact with a terminal a, and the sample-and-hold circuit 42 is kept in the sample state. As a result, the discharge current from the capacitor 8 becomes a constant current corresponding to a deceleration value for greater than the maximum deceleration actually attainable, and moreover the capacitor 8 is charged by the output of the phase comparator through diode 6 and resistor 7 of e.g. 30 KΩ. Thus, the vehicle-speed output voltage can follow the vehicle speed rapidly, as shown by B in FIG. 6. This is because the resistance of each of resistors 31 and 32 is so selected that the conductance (e.g. 100 KΩ) of the discharge path may form a time constant which makes rapid discharge of capacitor 8 possible. For a period $T_1$ shown in the waveform D of FIG. 6, the deceleration is determined by a time constant of the discharge circuit which is dependent upon the resistance values of resistors 31 and 32. The vehicle-speed output voltage is differentiated by the differentiating circuit 40 to be converted into an acceleration-deceleration signal, which is inverted by the inverting amplifier 41. The output of the inverting amplifier 41 becomes a positive voltage for deceleration and a negative voltage for acceleration, as shown by C in FIG. 6. The output of the inverting amplifier 41 is extracted in the sample-and-hold circuit 42 by a narrow pulse (having a pulse width w of 10 to 100 μsec) corresponding to the leading edge of the vehicle speed pulse $f_d$.

Figure 6:
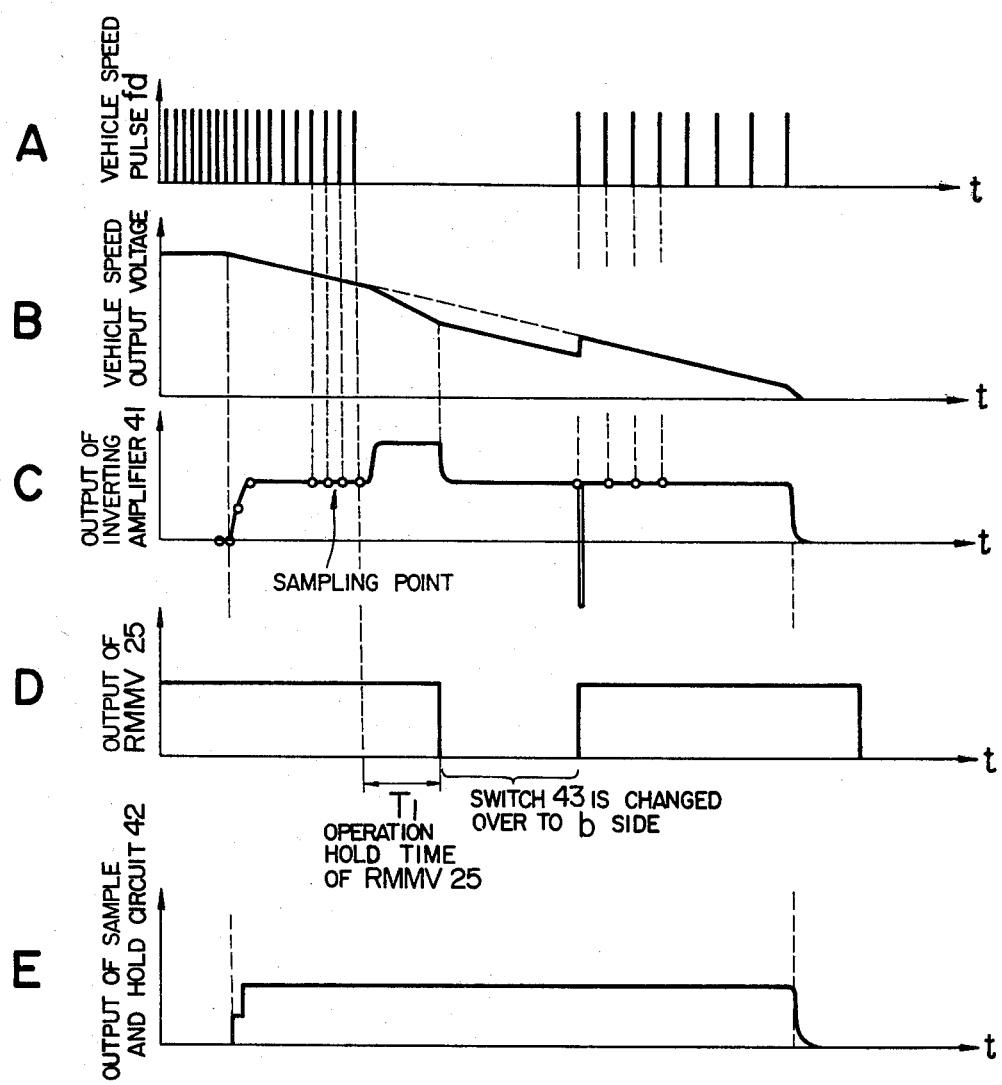
FIG. 6 is a timing chart for explaining the operation of the circuit shown in FIG. 5.

When vehicle-speed pulses are missing and no trigger pulse is applied to the RMMV 25 in the operation hold period $T_1$ of RMMV 25, the Q output of RMMV 25 is brought to the state of "0" (as shown by D in FIG. 6). Thus, contact 43a of the switch means 43 is kept in contact with a terminal b, and moreover the sample-and-hold circuit 42 is kept in the hold state. Accordingly, the non-inverting input terminal of the operational amplifier 28 is supplied with a voltage which corresponds to the deceleration at a timing just before the vehicle-speed pulses are dropped from the output signal of the waveform shaping circuit 2. Thus, the discharge of capacitor 8 is performed at a constant rate equal to the above deceleration, namely, with a time constant corresponding to the deceleration. The output of the sample-and-hold circuit 42 is shown by E in FIG. 6, and is constant as long as the kind of road surface is kept constant. In the above operation, charging of the capacitor 8 by the output of phase comparator 4 is not effected, and consequently the vehicle-speed output voltage is decreased in accordance with the deceleration just prior to the moment when the vehicle speed pulses are dropped. When the vehicle-speed pulses are again developed normally from waveform shaping circuit 2, the Q output of RMMV 25 is brought to the state of "1" and the vehicle-speed output voltage becomes equal to a voltage corresponding to the vehicle speed at this time. The vehicle-speed output voltage is taken out of the output terminal $V_a$ in analog form, and derived from the output terminal $V_d$ in digital form.

Description will be made of another embodiment of a vehicle-speed signal processing circuit according to the present invention, with reference to FIGS. 7 and 8. A characteristic of this embodiment is that, when vehicle-speed pulses are missing during the running, a vacancy or dropout in the vehicle-speed signal corresponding to the missing pulses is compensated by a plurality of decelerations such that the vehicle-speed voltage is decreased in accordance with respective deceleration values for respective predetermined periods. For example, the signal voltage for compensating the above vacancy is first decreased with a constant deceleration value for a predetermined period, and then is decreased rapidly for the next predetermined period by changing the time constant of the discharge circuit.

Figure 1:
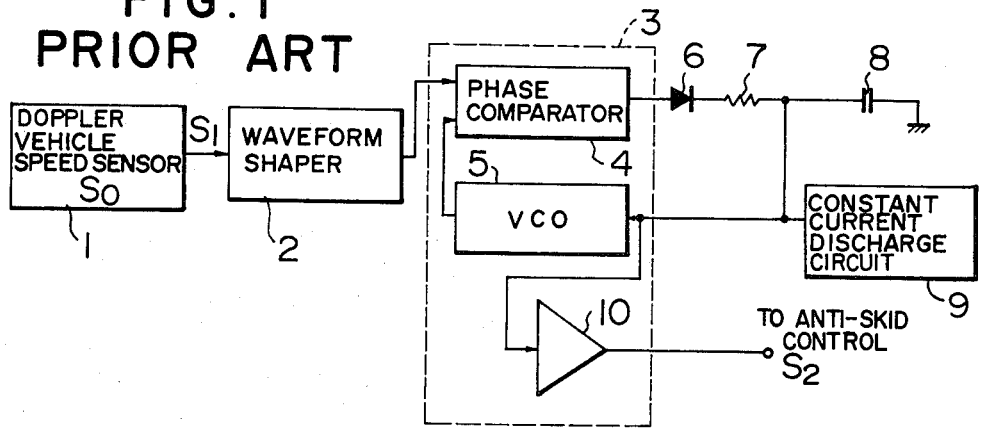
FIG. 1 is a block diagram showing a prior art signal processing circuit for a skid control device.
Figure 2:
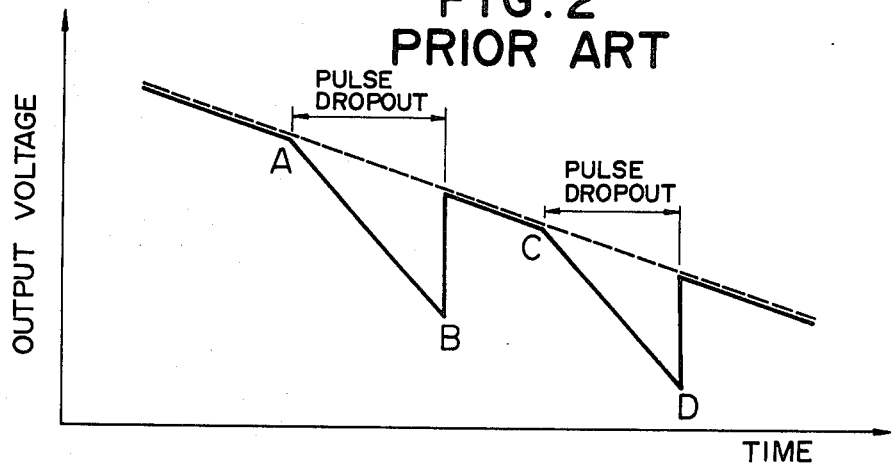
FIG. 2 is a graph showing a vehicle speed signal according to the prior art vehicle-speed signal processing circuit shown in FIG. 1, in a case where vehicle speed pulses are missing.
Figure 7:
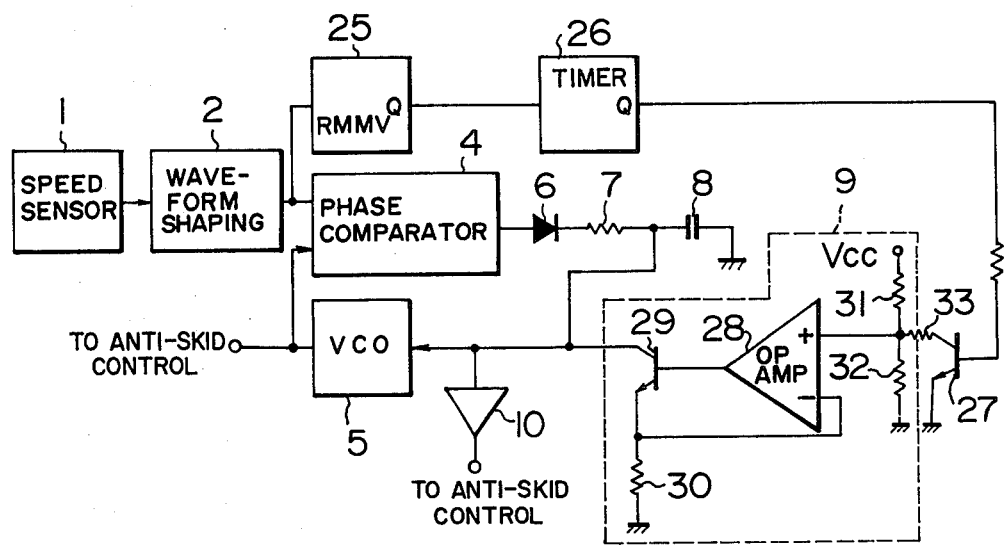
FIG. 7 is a block diagram showing another embodiment of a vehicle-speed signal processing circuit according to the present invention.
Figure 8:
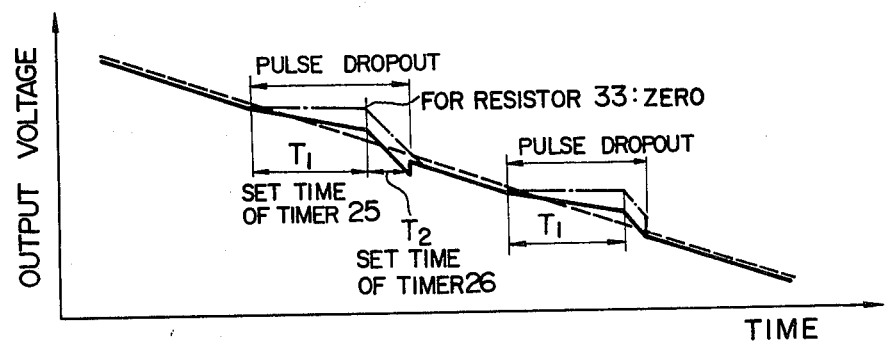
FIG. 8 is a graph which explains how a dropout in a vehicle-speed signal is compensated in the circuit shown in FIG. 7.

FIG. 7 is a block diagram showing the vehicle-speed signal processing circuit of the above embodiment, in which reference numerals 2 and 4 through 10 indicate the same elements of those in FIG. 1. The vehicle-speed signal processing circuit comprises a retriggerable monostable multivibrator (RMMV) 25, a timer 26, a transistor 27, an operational amplifier 28, a transistor 29, and resistors 30 to 33. The operational amplifier 28, the transistor 29 and the resistors 30 to 32 make up a constant current discharge circuit 9. The discharge path of capacitor 8 is made up of the collector-emitter resistance of transistor 29 and resistor 30.

The operation of the circuit shown in FIG. 7 is described below.

The unstable period $T_1$ of the RMMV 25 is set to a value which is a little greater than the vehicle-speed period for a vehicle speed of, for example, less than 5 Km/h. The Q output of RMMV 25 is kept in the state of "1" during the period when the vehicle-speed pulse is normally developed from the waveform shaping circuit 2, and therefore the timer 26 does not commence the timing operation. Accordingly, the Q output of timer 26 is kept in the state of "0" and thus transistor 27 is maintained in the "OFF" state. At this time, the non-inverting input of operational amplifier 28 is held at a constant voltage which is defined by a supply voltage applied to a power terminal $V_{cc}$ and the resistance of each of resistors 31 and 32, and the voltage applied to the inverting input terminal of operational amplifier 28, namely, the voltage across the resistor 30 is controlled by amplifier 28 and transistor 29 so as to become equal to the voltage applied to the non-inverting input terminal. In other words, the discharge current flowing through transistor 29 and the resistor 30 is kept constant by the voltage applied to the non-inverting input terminal of amplifier 28. Moreover, a charging current is supplied from phase comparator 4 to capacitor 8 through diode 6 and resistor 7 in an appropriate manner, during the period when the vehicle-speed pulse is normally developed during the running. Thus, the voltage of capacitor 8 follows the vehicle speed and provides the output voltage corresponding to the vehicle speed.

On the other hand, when vehicle-speed pulses are missing for a period longer than the unstable period $T_1$ of RMMV 25, the Q output of RMMV 25 is brought to the state of "0". As a result, the timer 26 commences the timing operation. During a set period $T_2$ the Q output of the timer 26 is kept in the state of "1", and transistor 27 is maintained in the conductive state. Accordingly, the voltage applied to the non-inverting input terminal of amplifier 28 is lowered, and the vehicle-speed output voltage is decreased in accordance with a deceleration value different from the initial deceleration. At this time, the time constant of the discharge circuit is determined by the ratio of the resistance of resistor 31 to that of resistor 33. After the set period $T_2$, transistor 27 assumes the cut-off state, and the vehicle-speed output voltage is decreased in accordance with a required deceleration value. FIG. 8 shows a vehicle-speed output voltage formed by the circuit shown in FIG. 7.

Further, in the above embodiment, a decrease in the vehicle-speed output voltage can be made nearly equal to zero by making the resistance of the resistor 33 equal to zero. Furthermore, when the $\overline{Q}$ output of timer 26 is employed in place of the Q output thereof, the vehicle-speed output voltage is decreased for a set period in accordance with a deceleration value equal to or greater than the deceleration just prior to the moment when vehicle pulses are dropped, and then is decreased in accordance with a deceleration value different from the above deceleration. In the above-mentioned embodiment, two different deceleration values are used. Naturally, three or more different deceleration values may be employed.

What we claim is:

1. A vehicle-speed signal processing circuit for a skid control device comprising:
   (a) an input terminal supplied with a Doppler pulse signal detected by a Doppler radar vehicle speed sensor, and Doppler pulse signal indicating vehicle speed;
   (b) frequency-voltage converter means connected to receive said pulse signal from said input terminal for converting said pulse signal into an analog voltage, said frequency-voltage converter means including charge means for accumulating electric charges corresponding to a vehicle-speed signal;
   (c) signal dropout detecting means connected to receive the pulse signal from said input terminal for detecting the absence of an incoming pulse in a predetermined time to generate a signal;
   (d) sample-and-hold means for sampling and holding a rate of change in the output voltage of said frequency-voltage converter means;
   (e) discharge-time-constant setting means connected to receive the output of said sample-and-hold means in response to the output of said signal dropout detecting means, for determining a discharge time constant of said charge means in accordance with the output from said sample-and-hold means; and
   (f) output means coupled to the output of said frequency-voltage converter for providing a compensated output signal, said compensated output signal being formed in such a manner as to compensate a missing part in said Doppler pulse signal.

2. A vehicle-speed signal processing circuit according to claim 1, further comprising a waveform shaping circuit connected to said input terminal for shaping said Doppler pulse signal detected by said Doppler radar vehicle speed sensor.

3. A vehicle-speed signal processing circuit according to claim 1 or 2, wherein said discharge-time-constant setting means includes means for discharging said charge means with a predetermined time constant when a signal dropout indicating signal from said signal dropout detecting means is absent.

4. A vehicle-speed signal processing circuit according to claim 1 or 2, wherein said frequency-voltage converting means comprises a phase-locked loop means and said signal dropout detecting circuit comprises a retriggerable multivibrator.

5. A vehicle-speed signal processing circuit according to claim 1 or 2, wherein the timing of sampling in said sample-and-hold means is determined by the leading edge of said pulse signal from said input terminal.

6. A signal processing circuit for supplying a skid control device with an output signal which is formed in such a manner as to compensate a missing part in an input signal, comprising:
   (a) an input terminal supplied with a Doppler pulse signal detected by a Doppler radar vehicle speed sensor, said Doppler pulse signal indicating a vehicle speed;
   (b) missing-signal detecting means for detecting the absence of an incoming pulse from said input terminal to generate a signal indicating said absence of said incoming pulse;
   (c) timing means connected to receive said signal generated by said missing-signal detecting means for generating a signal after a predetermined time;
   (d) a frequency-voltage converter means for converting a signal from said input terminal into an analog voltage waveform, said frequency-voltage converter means including charge means for accumulating electric charges corresponding to a vehicle-speed signal;
   (e) discharge circuit means for discharging said charge means with a plurality of time constants, said charge means being first discharged with a first time constant in response to said signal generated by said missing-signal detecting means and then discharged with a second time constant in response to said signal generated by said timing means; and
   (f) output means coupled to the output of said frequency-voltage converter means for providing a compensated output signal, said compensated output signal being formed in such a manner as to compensate a missing part in said Doppler pulse signal.

* * * * *